United States Patent [19]
Crits

[11] 4,267,159
[45] May 12, 1981

[54] CYANIDE RECOVERY

[75] Inventor: George J. Crits, Havertown, Pa.

[73] Assignee: Crane Co., New York, N.Y.

[21] Appl. No.: 176,355

[22] Filed: Aug. 8, 1980

[51] Int. Cl.³ .......................... C01C 3/08; B01J 41/04; C02F 1/42; C22B 3/00
[52] U.S. Cl. .................................... 423/371; 423/367; 423/658.5; 423/24; 423/29; 210/683; 210/684; 210/904; 75/105
[58] Field of Search ....................... 210/683, 684, 904; 423/24, 1, 658.5, 29, 367, 371

[56] References Cited
U.S. PATENT DOCUMENTS

| | | | |
|---|---|---|---|
| 2,648,601 | 8/1953 | Byler | 423/24 |
| 2,753,258 | 7/1956 | Burstall | 423/24 |
| 2,839,389 | 6/1958 | Kember | 423/24 |
| 2,965,441 | 12/1960 | Welton | 423/24 |
| 3,001,868 | 9/1961 | Aveston | 423/24 |
| 3,656,893 | 4/1972 | Sloan | 423/24 |
| 3,788,983 | 1/1974 | Fries | 423/367 |
| 3,869,383 | 3/1975 | Shimamura | 423/367 |
| 3,984,314 | 10/1976 | Fries | 210/683 |
| 4,115,260 | 9/1978 | Avery | 423/367 |

FOREIGN PATENT DOCUMENTS 2219121 9/1974 France ...................................... 210/904

OTHER PUBLICATIONS

Goldblatt "Recovery of Cyanide from Waste Cyanide Solutions by Ion Exchange", *Industrial and Engineering Chemistry* (3/59) pp. 241-246.

Yagashita et al., "Regeneration of Anion Exchange Resins Containing Cyanide from Waste Water" in *Chemical Abstracts*, vol. 79 (1973) No. 96,643s.

*Primary Examiner*—Brian E. Hearn
*Attorney, Agent, or Firm*—Charles A. McClure

[57] ABSTRACT

Spent aqueous liquor containing cyanide, as from ore treatment, is passed through a bed of suitable anion-exchange resin to segregate the cyanide, which is subsequently recovered in regeneration of the resin by weak alkaline solution. Both the eluted cyanide and the alkaline regenerant are recycled, if desired, for further ore treatment. A most important benefit of such procedure is nearly complete elimination of cyanide as a component of the treatment effluent. Free cyanide may be separated from complexed cyanides when present by using weak alkaline regenerant to elute the free cyanide from the resin and stronger alkaline regenerant to elute the complexed cyanides.

17 Claims, 3 Drawing Figures

CYANIDE RECOVERY

This invention relates to improved recovery of cyanide present in spent aqueous liquor from ore treatment and concerns especially substantially complete elimination of cyanide pollution of the effluent plus attendant cyanide conservation and reuse.

Use of aqueous liquor containing cyanide is common in ore treatment, especially in leaching of precious metals from ore in finely divided particulate form. Also known is segregation of cyanide from spent liquor by passage through a bed of anion-exchange resin followed by caustic flow regeneration of the resin and disposal of the cyanide, whether free or complexed, recovered in the elutriated regenerant.

Where only free cyanide is present it can be destroyed by gradual oxidation in holding tanks over a period of days, especially when well aerated, or within as short a time as an hour or so by adequate ozonation or chlorination. Cyanide complexes with iron or other metals, such as zinc, copper, or chromium, for example, are much less tractable but are sometimes formed intentionally to aid recovery and/or disposal, not only in ore treatment leachates but also in chemical process (such as alumina reduction, for example) and at other times occur spontaneously.

See for example, Trachtenberg, J. J. and Murphy, M. A., "Removal of Iron Cyanide Complexes from Waste Water Utilizing an Ion Exchange Process", TMS Paper LM-79-50 published by the The Metallurgical Society of the AIME, P.O. Box 430, 420 Commonwealth Drive, Warrendale, PA 15086; and Goldblatt, Eric of Stilfontein Gold Mining Co., Transvaal, Union of South Africa, "Recovery of Cyanide from Waste Cyanide Solutions by Ion Exchange", INDUSTRIAL AND ENGINEERING CHEMISTRY, vol. 51, no. 3, Mar. 1959.

In any event, presence of cyanide in untreated leachate or in regenerant discharge presents a pollution risk to fish and other animal life downstream from any disposal point in the absence of substantially complete elimination of cyanide from the effluent. Cyanide tolerance for fish life is currently set at only a few hundredths of a part per million (PPM).

A primary object of the present invention is substantially complete recovery of cyanide from ore leachate.

Another object is segregation of complexed cyanide from free cyanide when both are present, as in spent liquor from ore treatment.

A further object is recovery of cyanide for reuse, such as in a leaching agent for ore treatment.

Other objects of the present invention, together with means and methods for attaining the various objects, will be apparent form the following description and the accompanying diagrams, which are present by way of example rather than limitation.

In general, the objects of this invention are accomplished by passing aqueous liquor containing cyanide through a bed of appropriate anion-exchange resin to segregate the cyanide and subsequently recovering the cyanide in regeneration of the resin by suitable elutriant. More particularly, the invention enables complexed and free cyanides to be separated for disposal and/or, especially in the instance of free cyanide, for reuse as desired.

Figure 1:
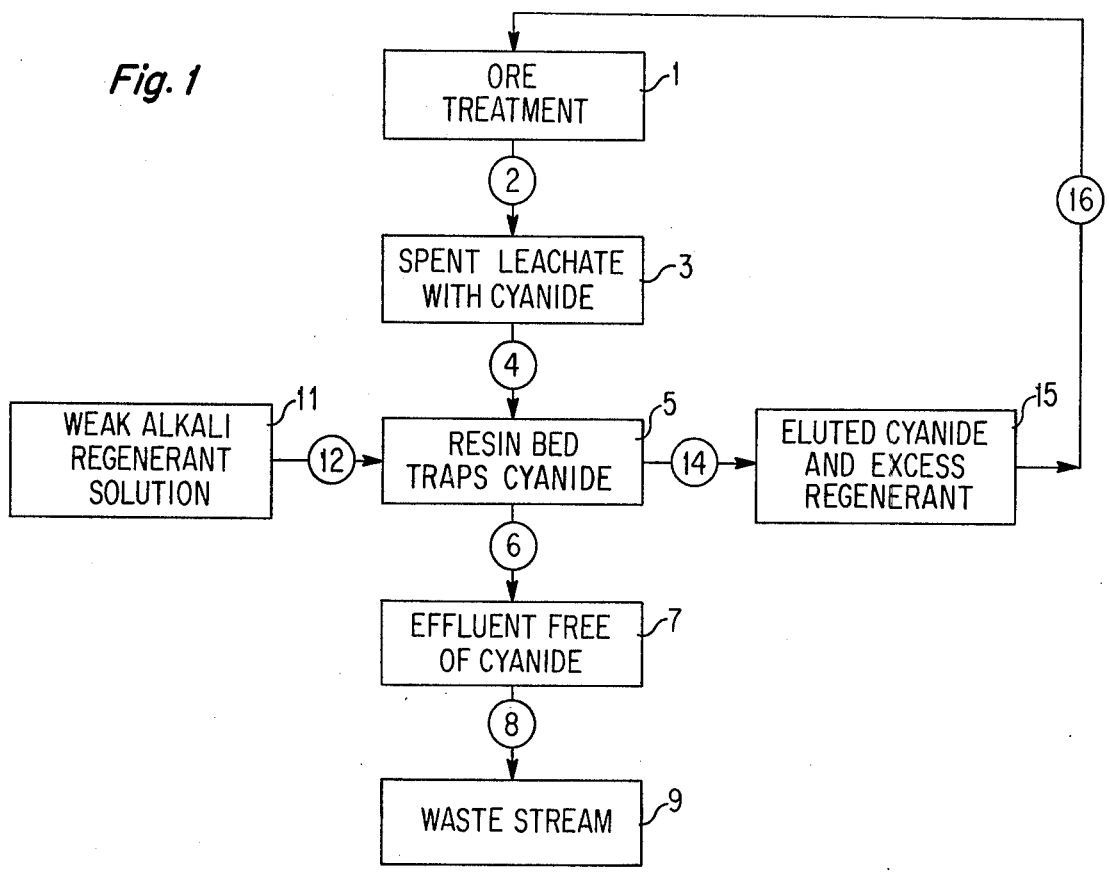
FIG. 1 is a recycling flow diagram according to this invention.

FIG. 1 shows the practice of this invention schematically, with materials or locations designated by uneven reference numerals and with flow paths therebetween designated by even reference numerals. Ore treatment 1 discharges by path 2 spent leachate 3 with cyanide to pass via path 4 through resin bed 5, which traps the cyanide and passes via path 6 effluent 7 free of cyanide to waste stream 9 via discharge path 8, completing the vertical downflow path in this view. Intermittently, with the vertical downflow valved off, regenerant flow occurs, preferably in the opposite direction (shown horizontally here for clarity). Weak alkali regenerant solution 11 flows via path 12 through the resin bed, freeing the cyanide from the resin to pass via path 14 as eluted cyanide and excess elutriant 15 back to the ore treatment via path 16 for reuse as a leaching agent.

Figure 2:
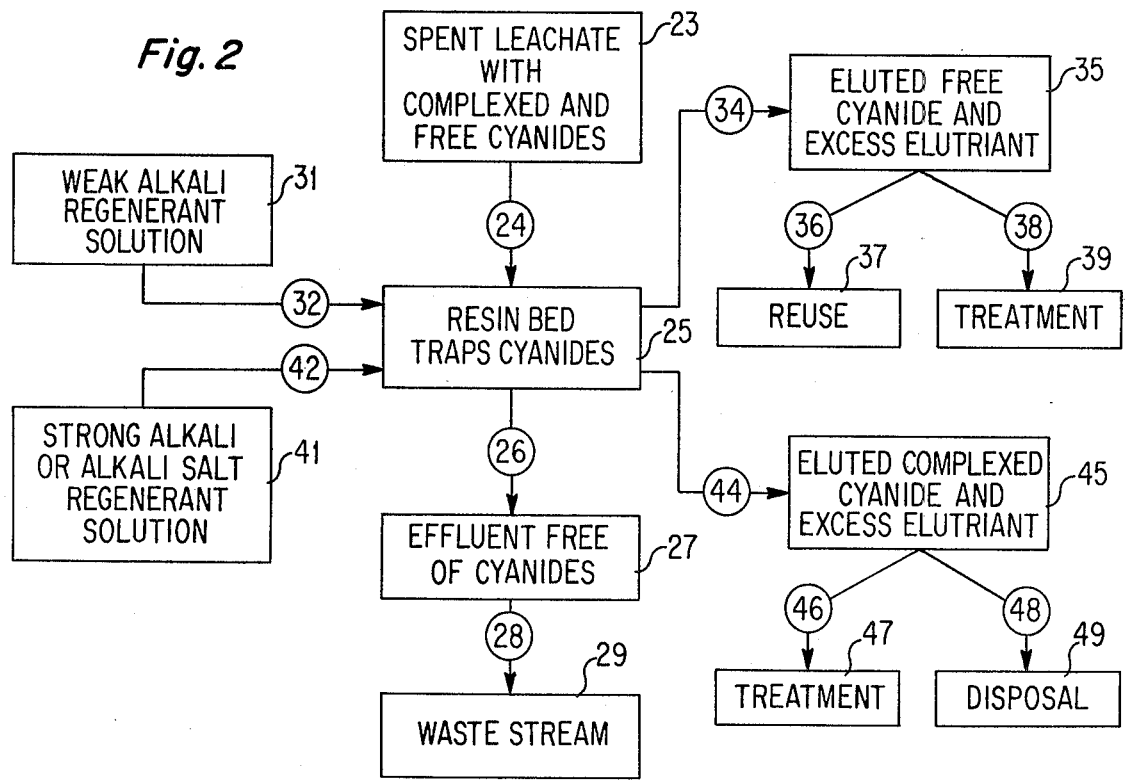
FIG. 2 is a modification to the recycling diagram of FIG. 1 for separation of free and complexed cyanides.

FIG. 2 shows schematically modification of such recycling practice as an embodiment of this invention, using reference numerals higher by 20 than those in FIG. 1, for corresponding steps, and illustrating separate recovery of free and complexed cyanides. Thus, spent leachate 23 with free and complexed cyanides passes via path 24 to resin bed 25 from which effluent 27 free of cyanides is discharged via path 26 and passes via discharge path 28 to waste stream 29. Intermittently weak alkali regenerant solution 31 is passed via path 32 to the resin bed, from which it releases uncomplexed or free cyanide over path 34, and eluted free cyanide and excess elutriant 35 pass over path 36 to reuse 37 (as in FIG. 1) or alternate path 38 to treatment 39. At greater intervals such as after every nth week alkali regeneration (with n preferably from about 20 to 40) the resin bed is subjected to strong alkali regeneration. Strong alkali regenerant 41 is passed via path 42 through the resin bed to release complexed cyanides and out via path 44, whereupon eluted complexed cyanides and excess elutriant 45 pass via path 46 to treatment 47 or via path 48 to disposal 49.

Figure 3:
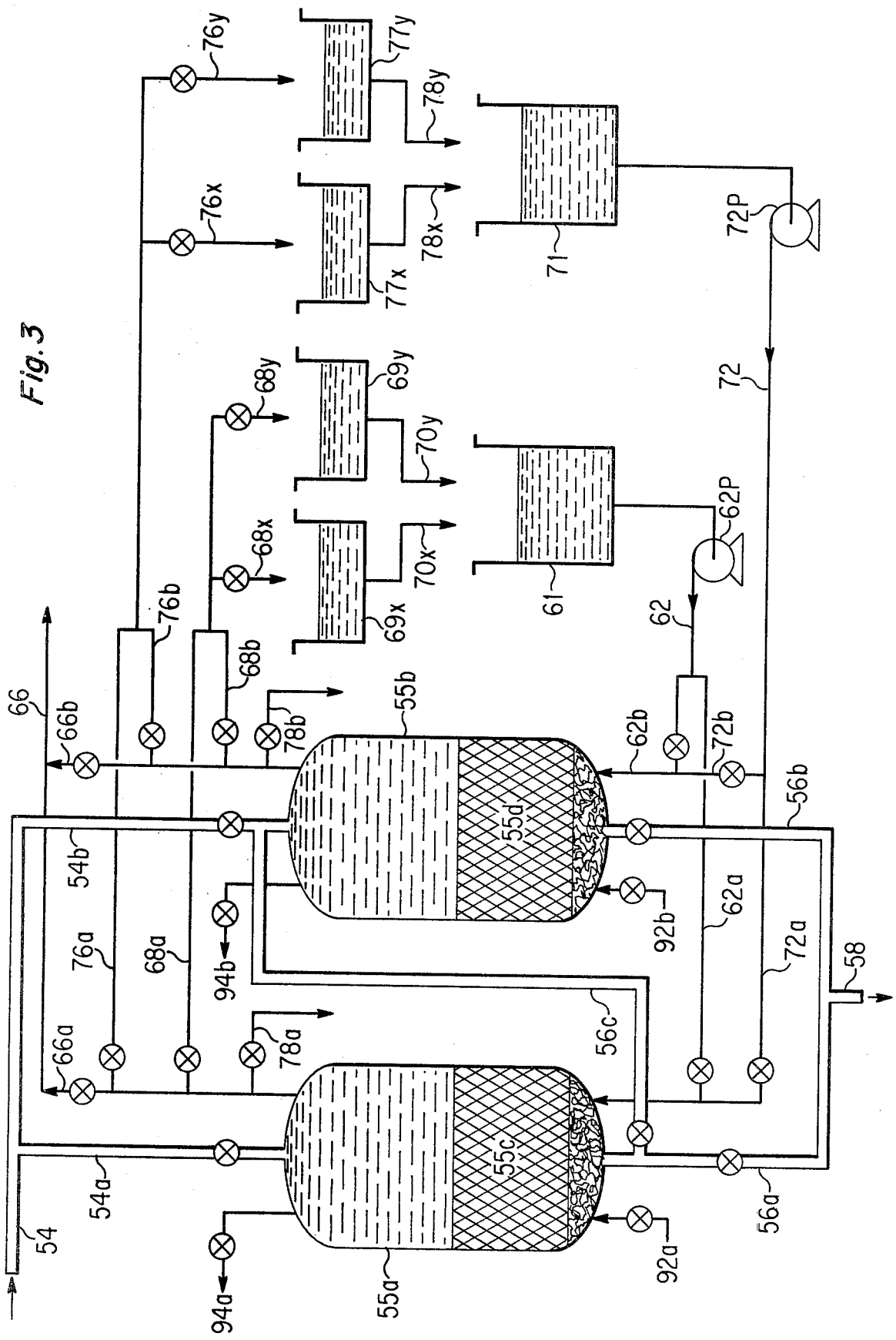
FIG. 3 is a schematic representation of apparatus for the practice of this invention, as in adjunct to ore treatment.

FIG. 3 shows schematically apparatus for practicing the invention shown in the preceding views. Valves are identified by reference numerals for the pipelines or flow paths in which they are located, without necessity of separate numbering. Pair of ion-exchange columns 55a, 55b, containing respective resin beds 55c, 55d receive the liquor to be treated, preferably already filtered, etc. via line 54 and branches 54a, 54b and subsequently discharge essentially cyanide-free effluent via discharge branches 56a, 56b and line 58, when the resins are operating. For use in series, branch 54b inlet valve is closed, and 56c connecting line valve is opened, while discharge branch 56a valve is closed, whereupon the influent passes through bed 55c in column 55a and through bed 55d in column 55b in sequence or series. For simplicity, however, the following description assumes operation in parallel, which can readily be converted to series operation by persons ordinarily skilled in the art.

Frequent regeneration includes passing weak alkali regenerant from tank 61 through line 62 using pump 62P and via branch lines 62a and 62b into the bottoms of columns 55a and 55b, through the respective resin beds, and out lines 66a and 66b to line 66 for reuse. Of course the valves in incoming lines 54a and 54b and bottom outgoing lines 56a and 56b are closed, as are the valves in top waste lines 78a and 78b and in treatment lines 68a and 68b. Closing valves in reuse lines 66a and 66b and opening valves in treatment lines 68a and 68b passes the eluate through lines 68x and 68y to ponds or tanks 69x and 69y from which, after destruction of the cyanide (as described above) the excess weak alkali passes via lines 70x and 70y into tank 61 for reuse. Infrequent regeneration includes passing strong alkali regenerant from tank 71 through line 72 using pump 72P and via branch lines 72a and 72b into the respective columns, through the resin beds therein and out the tops of the columns, to waste via lines 78a and 78b or via lines 76a and 76b to lines 76x and 76y into detention tanks 77x and 77y. After destruction of the complexed (and any free) cyanides, the excess strong alkali regenerant is passed via lines 78x and 78y into tank 71 for reuse.

Not yet mentioned, although provided for in FIG. 3, is the step of backwashing the resin, as is conventional, between flow in the forward or process direction and flow of regenerant in the opposite direction (usually). With all other valves closed, fresh water or clear effluent is passed into the bottom of the columns through lines 92a and 92b, through the resin beds, and out the tops of the columns through lines 94a and 94b. Backwash pressure usually is then discontinued, and the backwash liquid flow discontinued, before regenerant is pumped into and through the columns.

As used here "weak alkali" means aqueous solution of a weak base, calcium hydroxide (lime) being an example, and/or a dilute (at most 0.01 M) aqueous solution of a strong base or salt thereof suitable for regenerating an anion-exchange resin, such as sodium hydroxide and sodium chloride. On the other hand, "strong alkali" means only an at least 10 to about 30 times as strong aqueous solution of strong base or its salt, such as the examples just mentioned (only appropriately more concentrated.)

An anion-exchange resin suitable in the practice of this invention is a Type II strong-base resin, which customarily has a substructure of divinyl benzene/styrene in standard cross-linked arrangement with dimethyl ethanolamine for functionality (instead of trimethylamine, as in Type I strong-base resins, such as Amberlite IRA-400). Examples of such Type II resins include Amberlite IRA-410 and IRA-910 (available from Rohm & Haas Co.), Ionac ASB-2 (available from Ionac Chemical Co.), Dowex 2 (available from Dow Chemical Co.), and Lewatit M-600 (available from Farbenfabriken Bayer AG).

Weak-alkali regeneration of the resin is "frequent" in the sense of occurrring whenever leakage of cyanide in effluent from the bed exceeds a tolerable level, sudch as 0.1 part per million. "Infrequent" strong-alkali regeneration occurs on the order of once every dozen or so to every several dozen or so weak-alkali regenerations and may be desirable after a half dozen or so depending upon the complex concentration, type, etc. It will be understood that to avoid eluting free cyanide along with the complexed cyanides eluted with the strong-acid regenerant, each infrequent or strong-alkali regeneration preferably follows immediately a frequent or weak-alkali regeneration.

EXAMPLE 1

Solutions of free cyanide (CN—) in volumes from 25 to nearly 60 liters, at concentrations ranging from 15 to 60 PPM, usually 30 PPM, plus cyanide complexed by 2 PPM of zinc, 1 PPM of copper, and one half PPM of iron (measured as the metals), were passed in nine successive runs through an ion-exchange column containing IRA-910 Type II strong-base anion resin. Between successive runs the resin was regenerated with 0.1% lime solution in quantities of about 20 liters each time (range 14 to 28 liters). The modal (five runs) leakage of free cyanide was 0.1 PPM, and the average leakage was 0.8 PPM, evidencing good cyanide removal by such weak-alkali regeneration.

EXAMPLE 2

In the last two runs of Example 1 the leakage rose from 0.1 to 1.5 PPM despite an increase in the quantity of regenerant in the last run to 64 liters, corresponding to 1350 gallons per cubic foot of resin vs. the nine-run average of 420 gallons per cubic foot. The resin capacity based upon throughput free cyanide, although somewhat concentration dependent, fell from 2.1 kilograins per cubic foot initially to about 0.7 kilograin per cubic foot at the ninth run. Regeneration with 2.1 liters of 15% NaCl, corresponding to only 44 gallons per cubic foot of resin, restored the capacity to 1.8 kilograins per cubic foot at leakage of 0.1 PPM, the complexed cyanides having been removed from the resin by such strong-alkali regeneration. The benefits of freeing effluents from cyanide contaminants, conserving cyanide by recovering it for reuse, and facilitating separation of free and complexed cyanides, as for reuse and destruction, respectively, are apparent from the foregoing description. The preferred method of practicing this invention to attain such benefits has been shown and described. Persons skilled in the electroplating art or other industry using cyanide solutions will readily visualize applications or extensions of this invention thereto with like benefit.

Notwithstanding this description and illustration of the present invention, modifications may be made therein, as by adding, combining, or dividing parts or steps, or by substituting equivalents thereof, while retaining benefits of the invention, which itself is defined in the following claims.

The claimed Invention:

1. In treatment of particulate ore with aqueous liquor comprising cyanide to segregate minerals therefrom, wherein spent aqueous liquor is discharged subsequently, the improvement comprising the steps of passing the spent liquor through a bed of Type II strong-base anion-exchange resin and thereby removing and retaining cyanide present in the liquor, subsequently passing weak alkaline regenerant solution through the bed and thereby eluting cyanide therefrom and regenerating the resin, and recycling the regenerant solution with eluted cyanide for further ore treatment.

2. Ore treatment according to claim 1, wherein the original aqueous treating liquor and the regenerant solution both comprise lime.

3. Ore treatment according to claim 1, wherein the resin has a divinyl benzene/styrene standard cross-linked substructure plus dimethyl ethanolamine for functionality.

4. Ore treatment according to claim 1, including the step of discharging from the bed of anion-exchange resin an effluent resulting from flow of spent liquor thereinto, having the effluent cyanide concentration reduced to about one-tenth part per million.

5. Ore treatment according to claim 4, wherein the concentration of cyanide in the spent liquor before passing through the resin bed is at least about 100 times as great.

6. Process of treating spent aqueous liquor comprising cyanide, as from ore treatment, comprising passing the spent liquor through a bed of Type II anion-exchange resin and discharging the effluent therefrom to waste so long as the cyanide leakage is within tolerance, next backwashing the resin bed, then regenerating the resin by flowing an aqueous solution comprising weak alkali through the bed.

7. Ion-exchange process according to claim 6, repeated in recycling manner and wherein at intervals of from about one dozen to several dozen cycles the regenerant solution comprises strong alkali.

8. Ion-exchange process according to claim 7, wherein the weak alkali regeneration steps remove free cyanide from the resin and wherein the strong alkali regeneration step removes complexed cyanide as well from the resin.

9. Ion-exchange process according to claim 6, wherein the tolerance for cyanide in the effluent is about one-tenth part per million.

10. Ion-exchange process according to claim 9, wherein free cyanide concentration is reduced by a factor of at least about 100.

11. Ion-exchange process according to claim 10, wherein complexed cyanide concentration is reduced to a like degree.

12. Process of separating free and complexed cyanide anions from aqueous liquor containing both, comprising passing such aqueous liquor through a bed of Type II anion-exchange resin and thereby segregating the cyanides from the effluent from the bed, passing weak base or salt solution at intervals through the bed and thereby eluting the free cyanide, then passing strong base or salt solution through the bed and thereby eluting the complexed cyanide.

13. Cyanide separation process according to claim 12, wherein lime solution is used to elute the free cyanide, and caustic solution is used to elute the complexed cyanide.

14. Cyanide separation process according to claim 13, including the step of collecting the eluted free cyanide and lime solution at a first location, and collecting the complexed cyanide and caustic solution at a second location.

15. Cyanide separation process according to claim 14, wherein at the first location the eluted cyanide and lime solution is used in ore treatment, and at the second location the complexed cyanide is destroyed by chemical treatment.

16. Cyanide separation process according to claim 12, wherein the elutriant for the free cyanide comprises dilute caustic, and the elutriant for the complexed cyanide comprises more concentrated caustic.

17. Cyanide separation process according to claim 16, wherein the dilute caustic is at most 0.01 molar and the more concentrated caustic is at least about 10 to 30 times as concentrated.

* * * * *